US006393566B1

(12) United States Patent  (10) Patent No.: US 6,393,566 B1
Levine  (45) Date of Patent: May 21, 2002

(54) TIME-STAMP SERVICE FOR THE NATIONAL INFORMATION NETWORK

(75) Inventor: Judah Levine, Boulder, CO (US)

(73) Assignee: National Institute of Standards and Technology, Washington, DC (US)

( * ) Notice: Subject to any disclaimer, the term of this patent is extended or adjusted under 35 U.S.C. 154(b) by 1192 days.

(21) Appl. No.: 08/508,747

(22) Filed: Jul. 28, 1995

(51) Int. Cl.[7] .............................. H04L 9/30; G06F 1/12
(52) U.S. Cl. ...................... 713/178; 713/200; 713/400
(58) Field of Search .................... 380/30; 713/176–179, 713/156, 400, 200

(56) References Cited

U.S. PATENT DOCUMENTS

| | | |
|---|---|---|
| 4,868,877 A | 9/1989 | Fischer |
| 5,001,752 A | 3/1991 | Fischer |
| 5,005,200 A | 4/1991 | Fischer |
| 5,022,080 A | 6/1991 | Durst et al. |
| 5,031,214 A | 7/1991 | Dziewit et al. |
| 5,136,646 A | 8/1992 | Haber et al. |
| 5,136,647 A | 8/1992 | Haber et al. |
| 5,163,091 A | 11/1992 | Graziano et al. |
| 5,189,700 A | 2/1993 | Blandford |
| 5,191,613 A | 3/1993 | Graziano et al. |
| 5,214,702 A | 5/1993 | Fischer |
| 5,367,573 A | 11/1994 | Quimby |
| 5,373,561 A | 12/1994 | Haber et al. |
| 5,497,422 A * | 3/1996 | Tysen et al. .................. 380/25 |

OTHER PUBLICATIONS

Lechter, "Doing Business on Internet: the Electronic Signature," Mar. 9, 1995.
Garfinckel, "Patented Secrecy," Forbes, Feb. 27, 1995, pp. 122–124.
Cipra, "Electronic Time–Stamping: The Notary Public Goes Digital," and "All the Hash That's Fit to Print;" Science, Jul. 9, 1993.
Anderson, "Foiling the Forgers ," Discover Magazine, 10–92.
Federal Iinformation Processing Standards Publications 186, Digital Signature Standard (DSS), May 19, 1994.
Federal Iinformation Processing Standards Publications 180, Secure Hash Standard, May 11, 1993.

* cited by examiner

Primary Examiner—Gilberto Barron, Jr.
(74) Attorney, Agent, or Firm—Charles E. Rohrer

(57) ABSTRACT

A system and method for time-stamping and signing a digital document by an authenticating party and returning the signed stamped document to the originator or his designated recipient. Messages may be received by a first "public" machine over a network, by fax, or through input mediums such as diskettes. The clock of the first machine is synchronized with Universal Coordinated Time (UTC) and can be checked for accuracy by anyone on the network. A second "private" machine, not connected to any network, receives the time-stamped message, applies a hashing procedure and provides a signature using a private key. The signed hashed time-stamped message is then returned. A verify procedure is made widely available to check the genuiness of a document by rehashing the document and applying a public key. The result should match the signed time-stamped message returned by the authenticating party.

12 Claims, 7 Drawing Sheets

TIME-STAMP SERVICE FOR THE NATIONAL INFORMATION NETWORK

This invention relates to computer technology and more particularly to a system for verifying the time at which a digital document is received by an authenticating agency together with verification of a digital signature supplied by the agency.

BACKGROUND OF THE INVENTION

The authenticity of signed paper documents is attested to by signing the document in the presence of a Notary Public. The Notary Public usually adds a permanent alteration to the document such as an impression of a seal together with the signature of the Notary and the date upon which the Notary witnessed the signature which is being authenticated.

There are many situations where it is important to prove that a digital document existed on a certain date and time in its current form. Sometimes it is also important to establish the authorship or at least the ownership of the digital document on that same day. Examples include the Disclosure of Inventions, ordinary commercial transactions such as Bills of Sale, or Payments of Invoices, Wills, and other contracts where time is a factor. While conventional Notaries Public can meet the need for ordinary documents written on paper, there is currently no generally available analogous service for documents that are in digital format. Examples of such documents include computer files generated by word processors or spreadsheet programs, and binary files such as compiled computer programs and digitized or scanned images such as are produced by scanners or facsimile machines. It is also needed to establish the authorship and date of creation for digital audio and digital video recordings.

U.S. Pat. Nos. 5,136,646; 5,136,647; and 5,373,561 disclose a system for time-stamping a digital document and catenating the certificate number with another document certified at some time prior to the current document. A subsequent document will refer to the certificate number of the current document. In that manner the time-stamp of the current document is placed between the time-stamping of two other documents received by the system. Such a system does not provide the exact time of receipt so therefore it attempts to show relative time by relating the time-stamp to previous and subsequent document receptions which may be owned by other parties.

U.S. Pat. No. 5,022,080 also relates to a system for time-stamping a received document. Once the time indication has been generated the received document and the generated time indication is encrypted to generate a combination of the two units of information.

U.S. Pat. Nos. 4,868,877; 5,001,752; 5,005,200 and 5,214,702 relate to a system in which a time-stamp is provided by a clock module operated by the authenticating party. The system is designed to certify a digital signature of the creating party through a hierarchy of nested certifications and signatures indicating the authority and responsibility of the agency granted to them by the individual whose signature is being certified.

It is desired to provide a simple system for proving that a digital document existed on a certain date and time in its current form. It is therefore an object of the invention to provide a system in which the accuracy of the time-stamp is unquestioned and in which there is no need to refer to previous or subsequent documents which may be owned by third parties.

It is a further object of the invention to provide a service in which a private key is used to add the signature of the authenticating agency through the use of a machine that is secure from an attack by network.

SUMMARY OF THE INVENTION

Briefly stated, this invention relates to a system for proving that a digital document existed on a certain date and time in its current form. The system applies a signed time-stamp to a document in digital format. When a document is received a time-stamp is applied utilizing the National Institute of Standards and Technology (NIST) cesium clock ensemble. The time of the receiving processor which may be connected into an electronic network is continuously adjusted to the cesium clock to keep it within a few milliseconds of that clock. After applying the time-stamp to the document, the document and the time-stamp are transferred to a second computer that is not connected to the Internet or any other electronic network for processing with a hashing algorithm to produce a numerical representation of the stamped document. A private key is utilized at the second processor for encrypting a digital signature of the authenticating agency and adding that encrypted digital signature to the hashed time-stamped document. The encrypted signed hashed time-stamped document is then returned to the network for sending it to the designated recipient.

The document can be authenticated by application of the hashing algorithm and the encrypted signature of the authenticating agency can be reproduced by application of a public key. If the document has been altered in any fashion, the authenticating process will fail. Thus, the accuracy of the original document, the time at which it was received by the authenticating agency, and the signature of the authenticating agency can be ascertained to prove the genuineness of the digital document.

The system can operate with any digital format including simple text files, binary files, scanned images, etc. The document can be encrypted or encoded by the sender. It can also be compressed by the sender so that the full text need not be revealed even to the authenticating agency. The system is designed to be computationally infeasible to alter the document or the time-stamp without invalidating the signature. It is also computationally infeasible to transfer the time-stamp or the signature to another document. The time-stamp is accurate to a few milliseconds and the accuracy is directly traceable to Universal Coordinated Time (UTC) with which it is synchronized. The system provides for public inspection of the time the computer used to time-stamp by making that time available over the network. The system can be accessed automatically via standard E-mail protocols or files can be transmitted to the authenticating agency manually using diskettes, tapes, or similar media. The signed document can be returned by mail or sent electronically or forwarded automatically to any number of third parties as requested by the sender. The signature can be verified by anyone using publicly available verify software and a standard personal computer or its equivalent. The system also supports optional authentication of the sender using an additional signature function. The system is designed to protect the signature keys by storing them on a machine that cannot be accessed over the network. If desired, a stand-alone machine not connected to a network can perform both time-stamping and signature functions.

The above mentioned and other features and objects of this invention and the manner of attaining them will become more apparent and the invention itself will best be understood by reference to the following description of embodiments of the invention taken in conjunction with the accompanying drawing.

DETAILED DESCRIPTION

Figure 1:
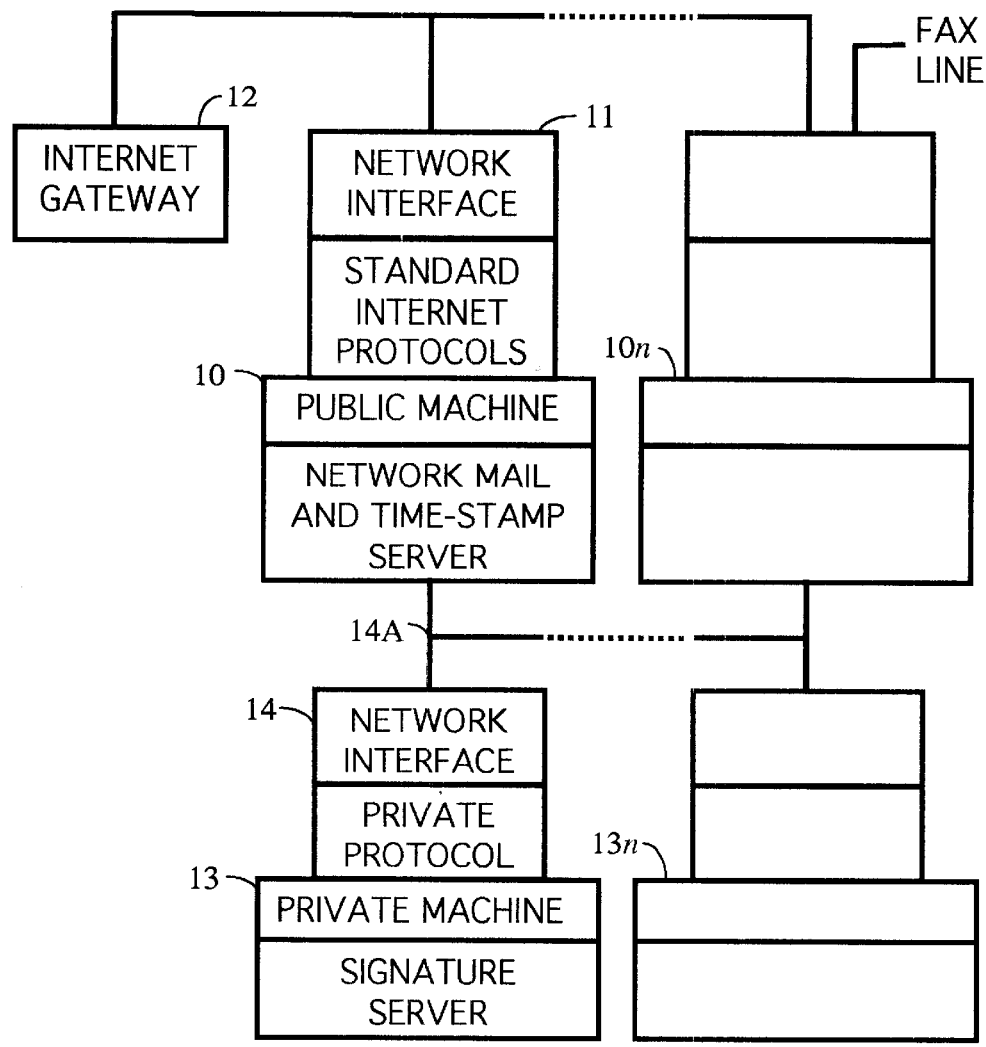
FIG. 1 shows the hardware configuration of the invention using a "public" machine connected to an electronic network and a "private" machine not so connected.

The system and method of the current invention consists of a group of cooperating processes that are implemented on at least two computers: a "front" machine directly connected to the Internet in the standard manner and a "back" machine with a limited suite of network software. In an implementation, the "front" machine is realized using a standard UNIX workstation and the "back" machine is implemented using a standard personal computer (PC) running MS/DOS (WINDOWS software can be present but is not needed).

The front machine is provided with a direct connection to the UTC(NIST) cesium clock so that the time of the "front" computer is continually adjusted to keep it within a few milliseconds of that clock. Time synchronization can utilize the techniques of U.S. Pat. No. 5,274,575 or a number of other methods such as the Network Time Protocol (NTP) available on the Internet. The time of the "front" computer is continuously available to any user on the Internet in a number of standard formats including NTP. Any user may request the time in any standard format as often as desired and can compare that time with UTC time information to verify the accuracy of the time-stamping performed by the front machine.

In operation over an electronic network such as Internet, the authenticating agency receives messages addressed to the time-stamp service. When received, messages are stamped with the time of the receiving machine and are placed in a queue for signature. The system will automatically honor a request for a receipt from the sender and will issue an electronic receipt as soon as the message has been received. The receiving process will accept documents from a wide range of sources with different operating systems and character formats. The message need not be in clear text and may be binary or scanned images or it may be encrypted or compressed text. Whatever the form in which the message is received, it is time-stamped and placed in the queue for receiving the signature of the authenticating agency.

The "back" machine takes the time-stamped document and processes it with a standard hashing algorithm to produce a "fingerprint" of the timed stamped document to which is applied a digital signature. The signed document is then returned to the front machine. An electronic link between the two machines can only be activated by the "back" machine and it will not accept connection requests of any kind.

When a document is received manually, that is on an input medium such as a diskette, for example, the document is read into the back machine which is then used to apply both the time-stamp and the digital signature. The procedure combines setting the local back machine clock to the Universal Coordinated Time, adding a time-stamp, hashing the stamped document, and then signing the resulting numerical representation of the stamped document using methods analogous to procedures described above. The signed representation is written to a separate file on the input medium; the input file to which the signature applies is not altered. The input medium is then sent to whomever has been designated by the sender.

The system is also designed to authenticate the digital signature of an originating party. That may be done where the originating party utilizes a private key to sign the document. The authenticating agency can utilize a public key to validate the signature of the sender. It is the responsibility of the originating party to keep their private key secret.

In order to verify the signature of the authenticating agency a standalone procedure is freely distributed so that the signature can be verified on any ordinary standard PC. The source code is written using a standard language and is publicly available so that the verifying software can be easily moved to any environment. The robustness of the procedures can also be independently confirmed.

If desired, the user of the system can send a compressed hash code of the document. In that manner a very large document can be compressed and transmitted through the E-mail system and if desired, many documents may be compressed together for signature by the authenticating agency.

It should be noted that the system is visualized as using the public and private keys in the signature process specified in Federal Information Processing Standard, (FIPS) 186, the "Digital Signature Standard". The system also utilizes (FIPS) 180 which is the "Secure Hash Standard," but can utilize any appropriate hashing algorithm. These standards are issued by the Department of Commerce of the United States of America and are designed by the Computer Systems Laboratory of the National Institute of Standards and Technology, Gaithersburg, Md. 20899. (FIPS) 180, issued May 11, 1993, and (FIPS) 186 issued May 19, 1994, are incorporated herein by reference. The system is modular in that later modifications of the hash or signature standards will not affect the operation of the system.

The signature procedures are independent of the operating system or the format of the document. The signature is not altered by changing the margins of the text, for example, or by changing from single spaced printing to double spaced. The file has the same signature on many of the common platforms and operating systems including most variants of UNIX, MS/DOS and WINDOWS. The signature algorithm automatically converts these various formats to a common denominator signature format thus providing a signature that is independent of the underlying operating system in a formal sense. Alternatively, the document can be signed in binary format but when a document in binary format is copied from one system to another, it may not be displayed properly on the target system without a conversion that will invalidate the signature computed in binary mode.

The signature and verification procedures are fully compliant with the requirements of the (FIPS) 186 documentation and any implementation of these requirements is suitable. For example, any verification software written by any third party can be used to verify a signature computed by the inventive system, provided only that it conforms to the specifications of (FIPS) 186.

A signed document can be verified at any later time by anyone having the publicly available verify program and a standard PC or equivalent computer. The validity of the signature of the authenticating agency can be confirmed by comparing the public key with the value published by the authenticating agency. Publication of the public key may be over an electronic network and in other conventional ways such as in newspapers. A combination of a verified signature and a matching public key guarantees that the document has not been altered since it was signed and that the time-stamp is authentic and could only have been produced by the authenticating agency.

The identity of the sender can be established in a number of different ways. If the sender has implemented digital identification, their encrypted signature becomes part of the signed document. If the sender has chosen to encrypt the entire document, then the decryption procedure will identify the submitter. If keys are used, the identity of the sender can be checked and validated by the authenticating agency. If none of these methods have been implemented, automatically submitted messages, that is by E-mail, the sender can be identified from the return address added by the E-mail procedures. Manually submitted messages, that is on a diskette, for example, can be identified from the postmarks and other receipts used to send the file to the authenticating agency.

FIG. 1 illustrates the hardware configuration of the system. A public machine 10, also referred to as "machine A", is connected through a network interface 11 to an Internet gateway 12. While the Internet is illustrated in FIG. 1, any type of electronic network can be utilized. The public machine 10 is a standard personal computer or its equivalent and serves to provide a receiving machine for network mail and to provide a time-stamp for that mail. The hashing algorithm may be exercised by the public machine 10. A private machine 13, also referred to as "machine B", is connected through a network interface 14 and cable link 14A to the public machine 10. The network interface 14 provides a private protocol through which the private machine 13 can address the output queue of the public machine 10 in order to obtain the incoming mail that has been time-stamped. The protocol prevents private machine 13 from responding to the public machine 10 or to any request that might occur on the electronic network. The private machine 13 is used to perform as a signature server and stores the private key used for generating the signature of the authenticating agency. It may also be used for performing the hashing function and that may be preferable since the public machine is subject to disruption from the network. After signing the hashed document and time-stamped representation, the representation with the signature is returned to the public machine which is then responsible for sending it back to the originator or to whomever the originator requested the document to be sent.

FIG. 1 illustrates that several public machines 10n may be connected in parallel with machine 10. Similarly, several private machines 13n may be connected in parallel with machine 13. In that manner, if one machine is in operation, the system continues to operate without interruption. Also, some of the machines may be able to accept different forms of input such as facsimile or through an optical scanner. As long as communication between the public and private machines follows the same conventions, the machines may be modified as desired.

Figure 2:
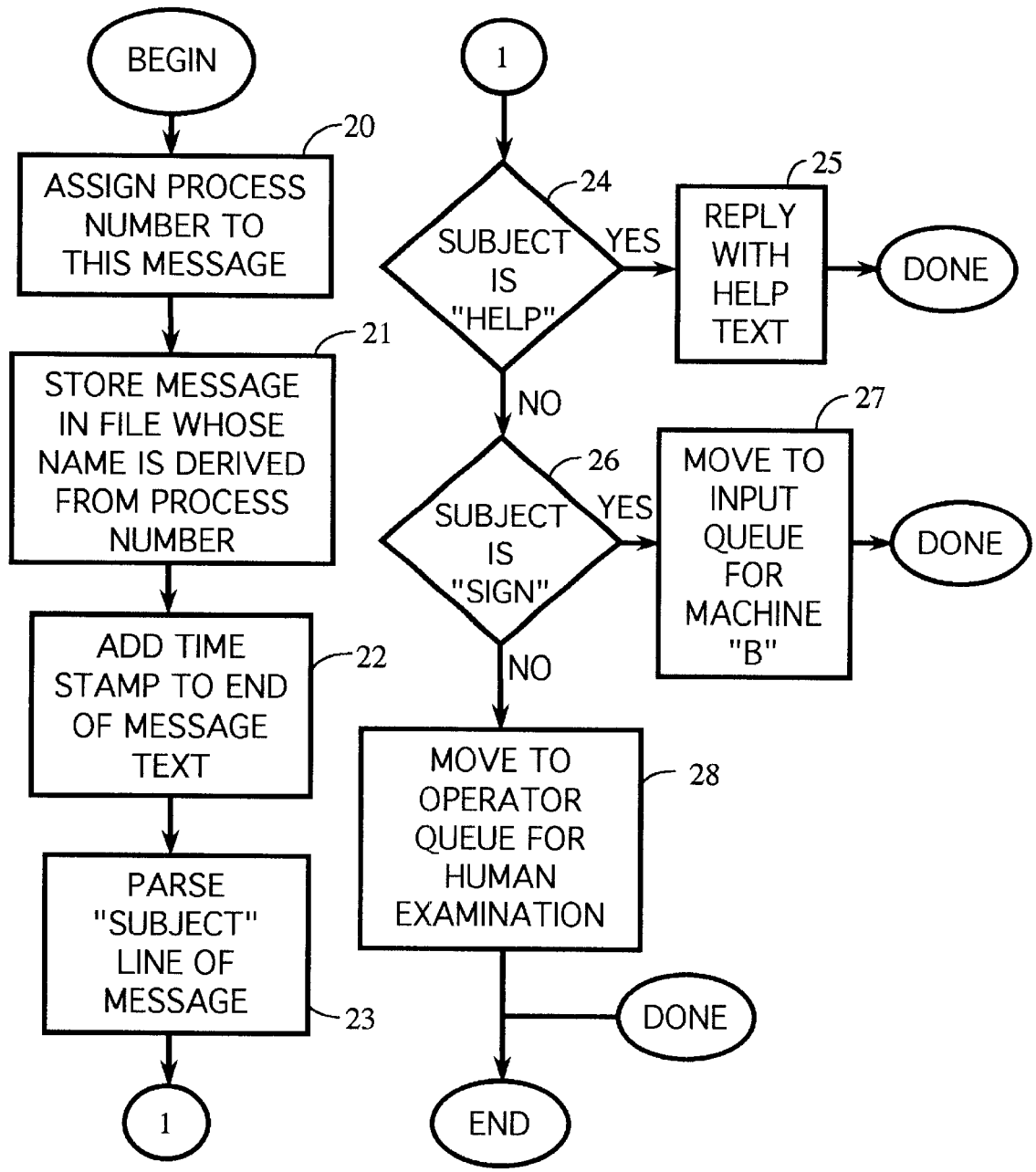
FIG. 2 shows the time-stamp process carried out on the public machine upon reception of a digital message.

FIG. 2 shows the server process carried out on the public machine 10 upon reception of input mail. This process is started by the operating system of the public machine whenever a message is received for time-stamping. At step 20 a process number is assigned to the received message and the message is stored as it is received at step 21 in a file whose name is derived from the process number. The process number is an arbitrary string constructed to ensure that each message has a unique name in the public machine. When the end of the message text is received a time-stamp is added at step 22 and stored with the text. The subject line of the message is parsed at step 23 and, if the subject of the message is to ask for "help", a branch is taken at step 24 to reply with help text as shown at step 25. If the subject is "sign", a branch is taken at step 26 to move the time-stamped message to the input queue so that it may be accessed by the private machine, that is, machine "B" as shown at step 27. If neither help nor sign is identified on the subject line of the message, the message is then moved to an operator queue for human examination at step 28.

Figure 3:
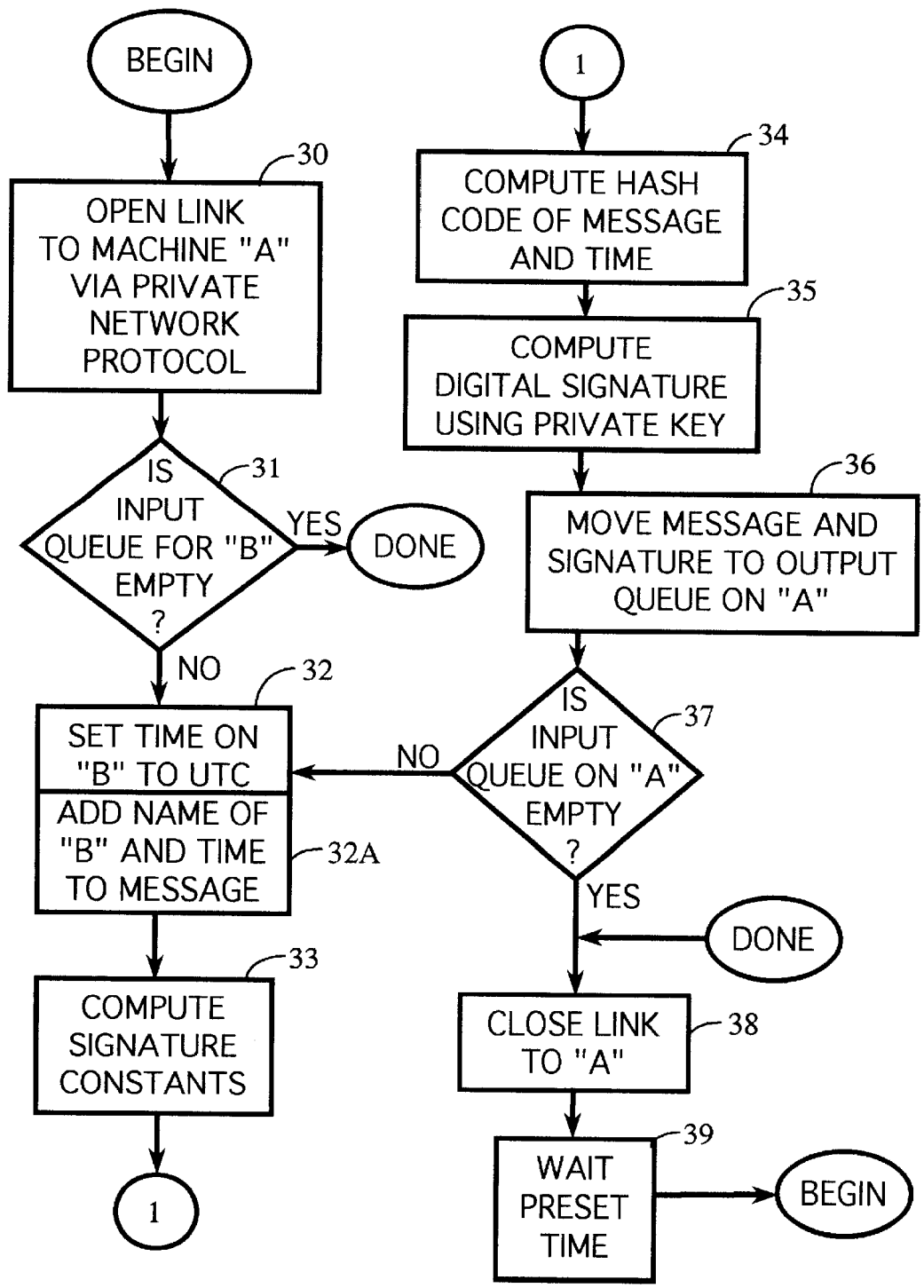
FIG. 3 illustrates the process followed by the private machine for signing the digital message by the authenticating agency.

FIG. 3 illustrates the process followed by the private machine 13. At step 30 the private machine 13 opens the link 14A to the public machine 10 via the private network protocol 14. Inspection of the input queue for the private machine is made at step 31. If time-stamped messages are in the queue, the time on the private machine is set equal to the network time service utilizing UTC(NIST) at step 32 and the name of the private machine and the time are appended to the message as shown at step 39A.

At step 33 signature constants are computed according to the Digital Signature Standard, (FIPS) 186. At step 34 the Secure Hash Standard (FIPS) 180 is used to compute the hash code of the message and the time-stamp.

Next, the digital signature is computed at step 35 using the private key established by the authenticating agency. At step 36 the hash code for the time-stamped message together with the signature is moved to the output queue on the public machine. At step 37 the private machine once again inspects the input queue on the public machine. If it is empty, the link 14A to the public machine is closed at step 38 and thereafter some preset length of time is established before the private machine, once again, opens the link to the public machine to determine if there are messages to be processed.

Figure 4:
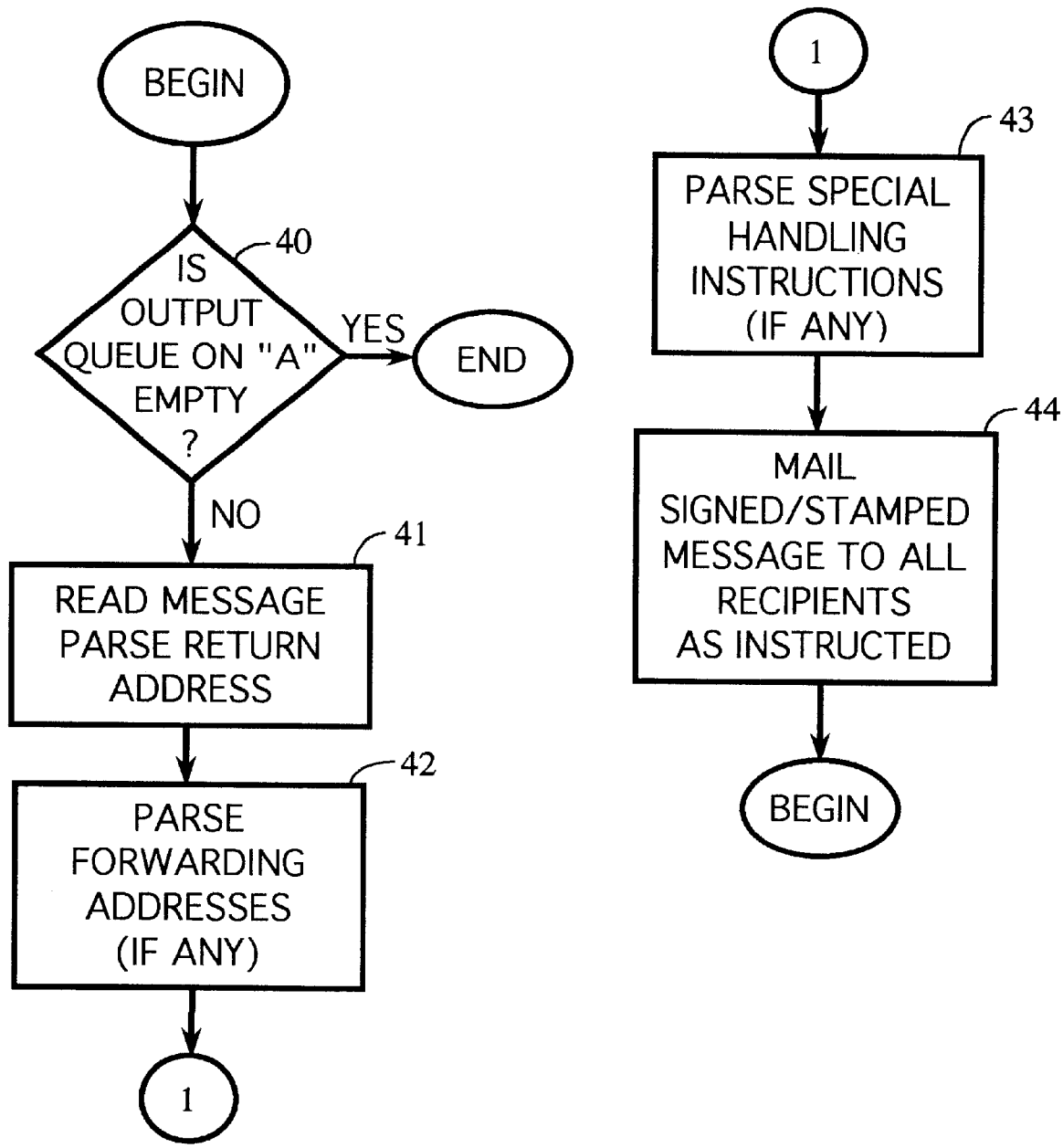
FIG. 4 shows the process followed in sending the signed time-stamped message to receiving parties.

FIG. 4 illustrates the process followed at the public machine to inspect its output queue in order to send messages which have been signed on the private machine to the party indicated by the sender. This process is started periodically by the operating system. At step 40 the output queue on the public machine is reviewed to determine whether a signed message is present. If it is, the message is parsed at step 41 in order to determine the return address to which the message is to be sent. Forwarding addresses, if any, are found at step 42 and any special handling instructions, at step 43. Finally, at step 44 the signed and time-stamped message is sent to all recipients as instructed.

Figure 5:
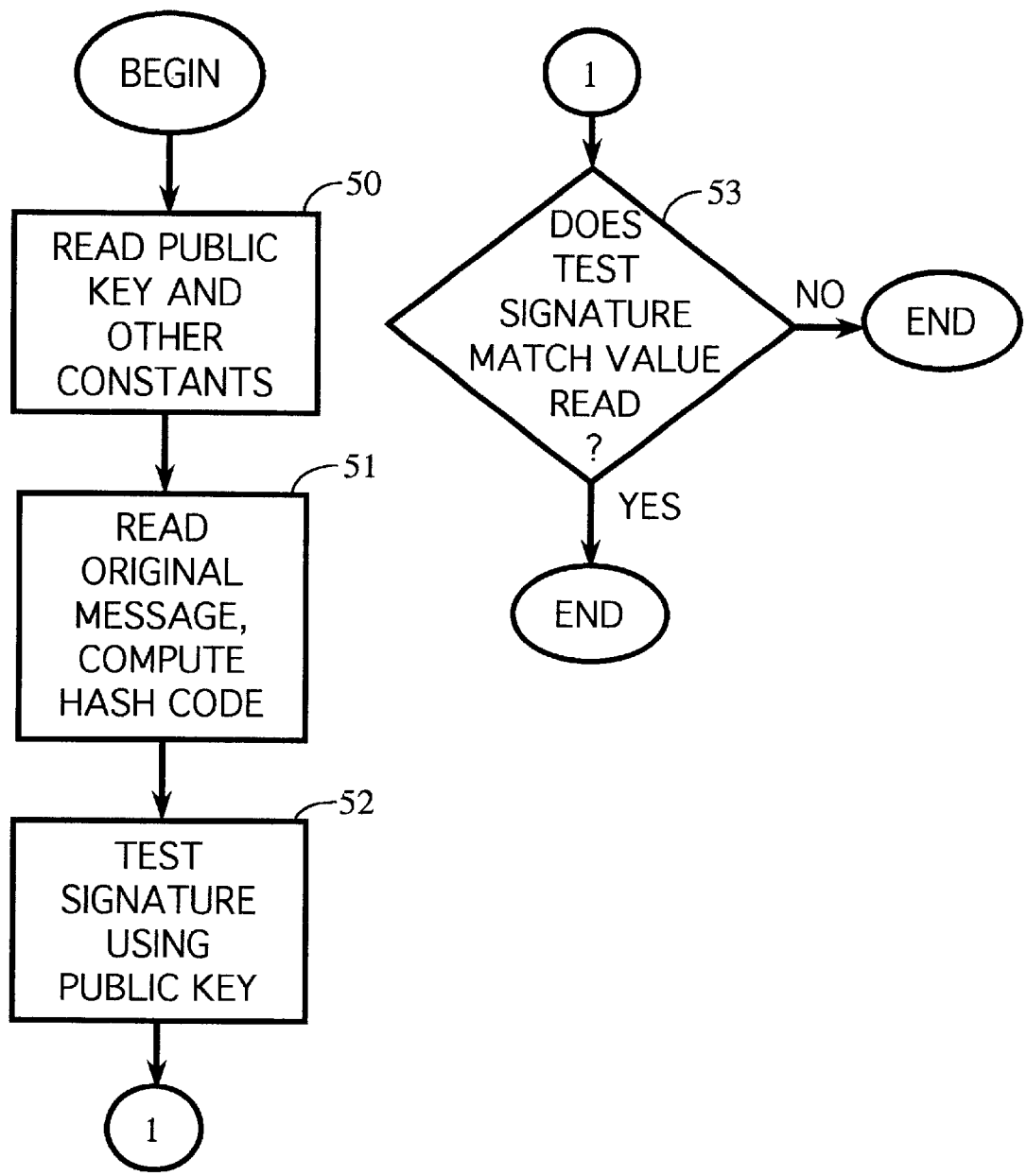
FIG. 5 illustrates a verification procedure for reproducing the digital, time-stamped message and the signature of the authenticating agency.

FIG. 5 illustrates a verification procedure that can be run on any machine by any third party in order to verify the signature of the authenticating agency together with the time-stamp on the message. At step 50 the public key is read in order to decipher the signature. The public key is different from the private key and is published by the authenticating agency on the Internet and in newspapers. A third party utilizes that public key in order to determine whether the authenticating agency signature is correct. At step 51 the hash function of the original message and its time-stamp is computed utilizing the Secure Hash Standard (FIPS) 180. Should there be any modification of the digital message or the time-stamp, the hash code will be altered and the public key will not verify the signature. In step 52 the signature is tested using the public key and at step 53, if the test signature matches the value read from the signed message, the signature is valid and the procedure ends.

Figures 6, 8:
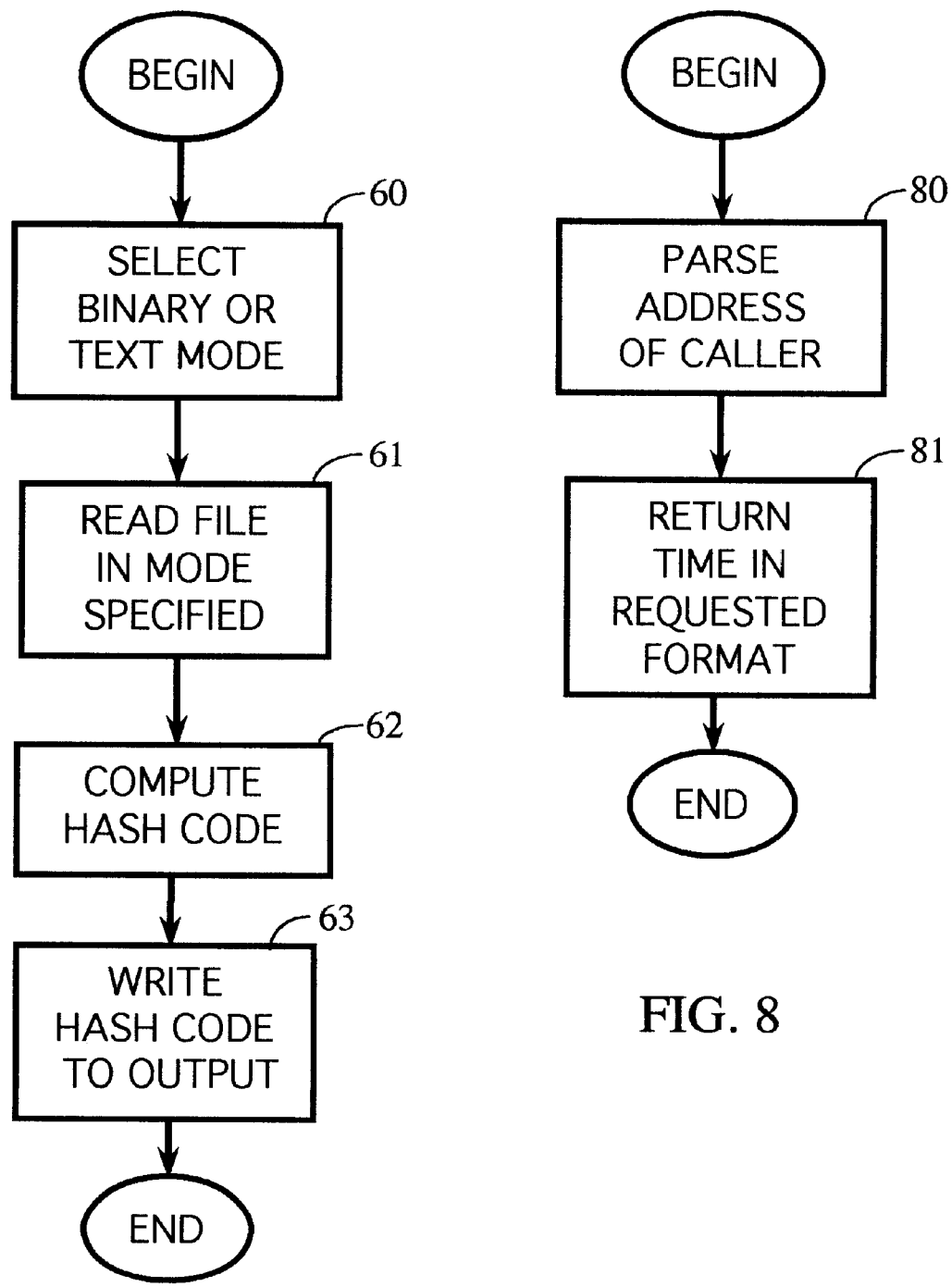
FIG. 6 illustrates the procedure of the hash code in reducing the time-stamped message to a numerical representation thereof.
FIG. 8 shows the process followed whenever the public machine receives a request for time information.

FIG. 6 illustrates the operation of the hash code which is run on machine A and/or machine B. At step 60 the user selects either binary or text mode according to (FIPS) 180. The file is read and the mode specified at step 61 and the hash code representing the document is produced at step 62. That hash code is written to the output at step 63 with the resultant numerical representation of the document being unique to that document. The modification of even a single bit of the document will change the hash code so that a subsequent calculation will produce a very different signature.

Figure 7:
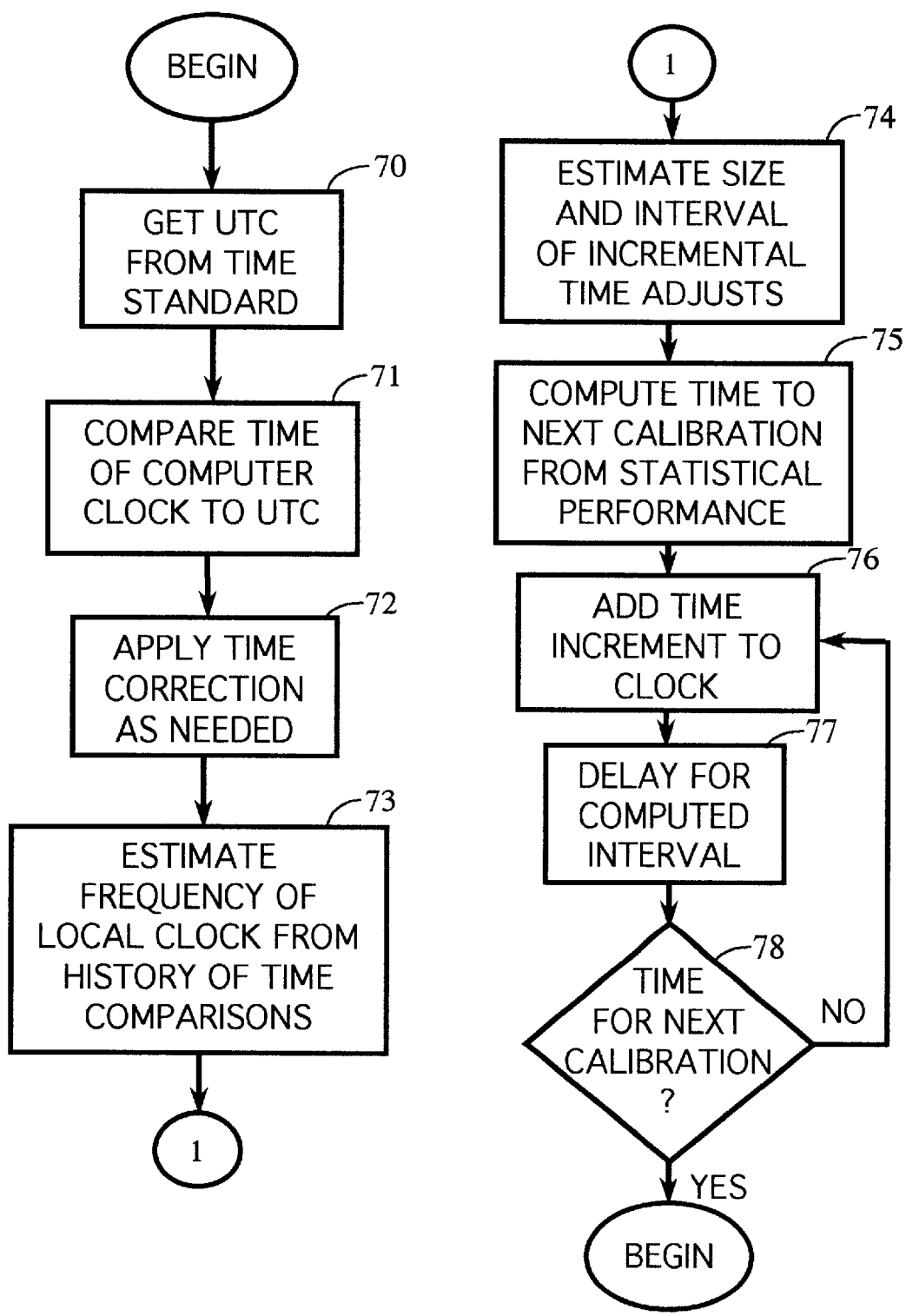
FIG. 7 shows the synchronization process to synchronize the clock of the computer which performs the time-stamped operation with the Universal Coordinated Time (UTC).

FIG. 7 shows the time synchronization process which is run on the public machine in order to synchronize the computer clock of the public machine with the Universal Coordinated Time (UTC) produced by the cesium clock located at the National Institute of Standards and Technology. The Universal Coordinated Time is obtained at step 70 and compared to the time of the computer clock at step 71. Any time correction needed is applied to the computer clock at step 72 in order to synchronize the computer clock with UTC. At step 73 an estimate is made of the frequency of the local clock from a history of time comparisons made with the UTC. At step 74 the size and interval of incremental time adjustments are estimated, and at step 75 the time to the next calibration with the UTC is computed based on the statistical performance of the computer clock. At step 76 the time increment to the next calibration is established, and the delay for the computed interval is completed at step 77. When time for the next calibration is reached, the time synchronization process begins again.

FIG. 8 is the process operated on the public machine whenever a request for time information is received over the network. This process enables anyone on the network to check the time of the public machine so that the public is aware that the time-stamp operation on the public machine is accurate. At step 80 the public machine parses the address of the caller and at step 81 returns the time in the requested format to the caller.

Periodically, the private and public keys may be changed by the authenticating agency according to procedures in the Digital Signature Standard (FIPS) publication 186.

The inventive system has a number of advantages. The publicly accessible machine contains none of the secret constants that are used to compute the signature. The time of the public machine can be observed by anyone enabling the adequacy of its synchronization with UTC to be publicly examined. The public machine is subject to attack and its security might be breached. Such an attack might alter the clock but such a change would be immediately detected since the clock on the public machine is under constant public scrutiny. In addition, the authenticating agency, should it be the National Institute of Standards and Technology, would be continuously monitoring the time of the machine since it is used as a network time server for that agency. While a security breach of the public machine might destroy messages in the queue or might try to destroy the entire system, the security of the digital signature process will not be affected since no part of that process is on the public machine. Any damage done in that fashion is clearly limited to the messages that are in the input and output queues when the attack takes place.

Another advantage of the system is that a message which is submitted to the public machine by E-mail will have time-stamps and routing information added to it so that the message that is actually signed will differ from that which was submitted by the sender. The time-stamp and the routing information added to the message as it travels the Internet system are unpredictable from the point of view of the submitter. In that fashion, the message to be signed cannot be completely specified by the submitter which may help to foil certain types of attacks against the procedure. Another advantage is that the machine which computes the signature need not be synchronized to the UTC since the primary time-stamp is applied by the public machine. Since the accuracy of the clock on the private machine is not significant to the performance of the system, there is no mechanism for publicly monitoring that clock.

In implementation of this system the only requirement is that the submitted text be composed of only printable characters. The process assumes that a message is composed of printable 8 bit characters encoded using the ASCII code and the message may be encrypted or hashed or may be in any language that can satisfy the requirement.

Another feature is the elimination of control codes which might be placed into a clear text document through a word processor. These control codes are used, for example, to change fonts or italicize something in the middle of the text. Such control codes create problems when the document is sent by E-mail since the document as it is printed out at the other end includes those control codes. In the inventive system common types of control codes are handled by changing the control code to a single space upon reception at step 21. Such a single space does not affect the computation of the message digest through the hashing algorithm at step 34.

When a document is sent to the time-stamp service offered by this invention and returned to the sender or to a third party, a preamble will have been added to the message by the electronic mail system during the return of the document to the sender or to his designated receiver. That preamble is not part of the signature or time-stamp. However, the preamble that is added by the electronic mail system when the document is submitted to the time-stamp system, becomes a part of the signed portion of the document and is included to confirm the provenance of the material. As the material travels from the sender to the time-stamp service, each mail gateway adds its own time-stamp in the electronic mail system. Those time-stamps are not official but serve as confirming evidence for the time-stamp added by the public machine. The time-stamp added by the receiving public machine is added at the bottom of the text. Finally, a signed document will have the signature. All of the parameters are part of the signature and must be preserved for verification to succeed. It may be noted that the private keys used are in the order of 800 digits in length so that it is infeasible to attempt derivation of the key by exhaustive search techniques.

While the invention has been described with respect to specific embodiments, it will be understood by those skilled in the art that various changes in form and detail may be made without departing from the spirit and scope of the invention which receives definition in the following claims.

What is claimed is:

1. A machine-implemented method for time-stamping and signing a digital message to establish the date and time when said message was received by a first machine, comprising the machine implemented steps of:

provided for the inputting of said message into said first machine;

providing for the coordination of the time of said first machine with Universal Coordinated Time (UTC);

providing for the addition of a time-stamp to said message, said time stamp being the Universal Coordinated Time (UTC) at which said first machine receives said message;

providing a procedure for checking the time accuracy of said first machine to verify the accuracy of the time-stamp;

providing for the computation of a hash code for the time-stamped message with a specific hashing procedure;

providing for the computation of a digital signature for the hashed time-stamped message utilizing a private key; and providing for outputting the signed hashed time-stamped message.

2. The method of claim 1 wherein said first machine is connected into an electronic network and further including the machine-implemented steps of:

providing for the acceptance of requests for the time of said first machine;

providing for the return of the time of said first machine to the requestor over the network wherein the accuracy of the time of said first machine can be checked by anyone connected into the network in a manner independent of the time-stamp operation.

3. The method of claim 2 wherein the steps of computing a hash code and computing a digital signature are performed on a second machine not connected to said electronic network, said method further comprising the step of:

providing for the transmittal of the time-stamped message from said first machine to said second machine.

4. The method of claim 3 further comprising the steps of:

providing for outputting the signed hashed time-stamped message from said second machine to said first machine; and providing for sending the signed hashed time-stamped message over said electronic network to recipients as directed by the originator of said message.

5. The method of claim 4 wherein said first machine and said second machine are owned and operated by an authenticating agency and wherein said agency publishes a public key to decipher said signature produced with said private key.

6. The method of claim 1 wherein the genuiness and authenticity of the signed hashed time-stamped message is verified through machine-implemented steps comprising:

reading the original message and computing the hash code of the message using said specific hashing procedure; and reading a public key and testing said signature using said public key.

7. A system for time-stamping and signing a digital message to establish the date and time when said message was received by a first machine, said system comprising:

a first machine including means for receiving a digital message and means for time-stamping said digital message upon reception with Universal Coordinated Time (UTC);

means for coordinating the time of said first machine with Universal Coordinated Time (UTC);

means for checking the time accuracy of said first machine to verify the time accuracy of the time-stamp;

means for computing a hash code for the time-stamped message utilizing a specific hashing procedure; and means for computing a digital signature for the hashed time-stamped message utilizing a private key.

8. The system of claim 7 wherein said first machine is connected into an electronic network, said system further including:

means adapted for accepting requests from said network for the time of said first machine in a manner independent of the time-stamp operation and returning said time of said first machine to the requestor wherein the time accuracy of the time of said first machine can be checked by any interested party on said network.

9. The system of claim 8 further including:

a second machine not connected to any electronic network;

means for enabling said second machine to receive a time-stamped digital message from said first machine; and said second machine including said means for computing a digital signature for the time-stamped message utilizing a private key.

10. The system of claim 9 wherein said second machine includes said means for computing a hash code for the time-stamped message.

11. The system of claim 10 further including:

means at said first machine for receiving the signed hashed time-stamped message from said second machine; and means at said first machine adapted for transmitting said signed hashed time-stamped message over said network.

12. The system of claim 11 further including:

a plurality of first machines each connected in parallel with said first machine, each capable of receiving messages and time-stamping the received message; and a plurality of second machines each connected in parallel with said second machine, each capable of receiving a time-stamped digital message and including means for computing a digital signature using a private key.

* * * * *